US012624753B2

(12) United States Patent
Kretschmer et al.

(10) Patent No.: US 12,624,753 B2
(45) Date of Patent: May 12, 2026

(54) PLANET CARRIER, PLANETARY DRIVE FOR A VEHICLE HAVING THE PLANET CARRIER AND SET COMPRISING A PLURALITY OF PLANET CARRIERS

(71) Applicant: Schaeffler Technologies AG & Co. KG, Herzogenaurach (DE)

(72) Inventors: Niklas Kretschmer, Gerhardshofen (DE); Michael Keck, Emskirchen (DE); Manuel Seubert, Eckental (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 115 days.

(21) Appl. No.: 18/562,063

(22) PCT Filed: Apr. 25, 2022

(86) PCT No.: PCT/DE2022/100309
§ 371 (c)(1),
(2) Date: Nov. 17, 2023

(87) PCT Pub. No.: WO2022/242788
PCT Pub. Date: Nov. 24, 2022

(65) Prior Publication Data
US 2024/0240711 A1 Jul. 18, 2024

(30) Foreign Application Priority Data
May 19, 2021 (DE) ..................... 10 2021 112 939.7

(51) Int. Cl.
*F16H 57/08* (2006.01)
(52) U.S. Cl.
CPC ....... *F16H 57/082* (2013.01); *F16H 2312/00* (2013.01)

(58) Field of Classification Search
CPC .................................. F16H 57/082; F16H 1/46
(Continued)

(56) References Cited

U.S. PATENT DOCUMENTS 1,281,785 A * 10/1918 Kellow ............... F16H 57/0482
475/159
1,843,987 A * 2/1932 Ragan ................... F02N 19/001
74/576
(Continued)

FOREIGN PATENT DOCUMENTS

CN        103133632 A      6/2013
CN        204921942 U      12/2015
(Continued)

OTHER PUBLICATIONS

Source: Decision of Refusal Corresponding to Japanese Patent Application No. 2023571665, dated Jul. 17, 2025.
(Continued)

*Primary Examiner* — Sherry L Estremsky

(57) ABSTRACT
A planet carrier includes a central axis, a pair of carrier shells, planet wheels and riveting devices. Each carrier shell has planetary wheel sections and connecting sections. The connecting sections are arranged as forming sections recessed relative to the planetary gear sections. Each of the planetary wheels is disposed in a planetary wheel section and the riveting devices connect the carrier shells at the connecting sections. Each riveting device is oriented in a circumferential direction around the central axis, is formed in one piece from one material, and has an H-shape. The H-shape is formed from a web section arranged as a spacer between the carrier shells and a rivet section with a pair of single rivets. Each single rivet has a rivet head disposed on one of the carrier shells to fix the one of the carrier shells on the web section.

17 Claims, 3 Drawing Sheets

(58) Field of Classification Search

USPC .......................................................... 475/337

See application file for complete search history.

(56) References Cited

U.S. PATENT DOCUMENTS

| | | | | |
|---|---|---|---|---|
| 3,527,121 A | * | 9/1970 | Moore .................. | F16H 57/082 |
| | | | | 475/331 |
| 4,793,214 A | * | 12/1988 | Nurnberger ............ | B62M 11/14 |
| | | | | 475/331 |
| 9,341,251 B2 | * | 5/2016 | Biermann ............... | F16H 48/38 |
| 2018/0306311 A1 | | 10/2018 | Valente | |

FOREIGN PATENT DOCUMENTS

| | | | | | |
|---|---|---|---|---|---|
| CN | 109986486 A | | 7/2019 | | |
| CN | 209324947 U | | 8/2019 | | |
| DE | 102006000760 A1 | * | 7/2007 | .......... | F16H 57/082 |
| DE | 102011011438 A1 | | 8/2012 | | |
| DE | 102011006285 A1 | | 10/2012 | | |
| DE | 102015213723 A1 | * | 1/2017 | .......... | F16H 57/082 |
| DE | 102015220827 A1 | * | 4/2017 | .......... | F16H 57/082 |
| DE | 102016219949 A1 | | 4/2018 | | |
| DE | 102017114452 A1 | | 8/2018 | | |
| DE | 102017112582 A1 | * | 12/2018 | .......... | F16H 57/082 |
| DE | 102018108664 A1 | | 6/2019 | | |
| DE | 102018109757 A1 | * | 6/2019 | .......... | F16H 57/082 |
| DE | 102018206171 | | 10/2019 | | |
| DE | 102019106947 A1 | | 10/2019 | | |
| DE | 102018119493 A1 | * | 2/2020 | .......... | F16H 57/082 |
| DE | 102018121865 A1 | | 3/2020 | | |
| DE | 102019117489 A1 | | 12/2020 | | |
| DE | 102019127546 A1 | * | 4/2021 | ............. | B21K 25/00 |
| JP | H0781614 B2 | * | 9/1995 | .......... | F16H 57/082 |
| JP | 2001200897 A | | 7/2001 | | |
| WO | 2019202047 A1 | | 10/2019 | | |

OTHER PUBLICATIONS

Source: Notice of Reasons for Refusal Corresponding to Japanese Patent Application No. 2023571665, dated Mar. 5, 2025.

Source: Notice of Reasons for Refusal Corresponding to Japanese Patent Application No. 2023571665, dated Oct. 15, 2024.

Source: Germany Patent and Trademark Office, Office Action dated Feb. 1, 2022, for priority Germany Patent Application 102021112939. 7.

Office Action Corresponding to Chinese Patent Application No. 202280035797.1, dated Mar. 19, 2026.

Zhenhua W., et al., "Design and Standard Practical Approaches for Transportation Machines," Anhui Cultural Photographic Press, Mar. 31, 2004, p. 41.

* cited by examiner

PLANET CARRIER, PLANETARY DRIVE FOR A VEHICLE HAVING THE PLANET CARRIER AND SET COMPRISING A PLURALITY OF PLANET CARRIERS

CROSS-REFERENCE TO RELATED APPLICATIONS

This application is the United States National Phase of PCT Appln. No. PCT/DE2022/100309 filed Apr. 25, 2022, which claims priority to German Application No. DE102021112939.7 filed May 19, 2021, the entire disclosures of which are incorporated by reference herein.

TECHNICAL FIELD

The present disclosure relates to a planet carrier, a planetary drive for a vehicle with the planet carrier and a set consisting of a plurality of such planet carriers.

BACKGROUND

Planetary gears are often used in the drive train of vehicles to translate, reduce, distribute or combine drive torque. Such planetary gears often have a planet carrier, which forms a rotatable base for a plurality of planetary wheels, which are rotatably arranged in a pitch circle diameter about an axis of rotation of the planet carrier. The planetary wheels mesh, for example, with a ring gear and/or with a sun gear.

The publication DE 10 2019 106 947 A1 discloses a planet carrier with a first cheek, a second cheek and with at least one connecting web in which the first cheek and the second cheek are connected to one another via the connecting web and are held axially separated from one another by means of the connecting web at a distance. The connecting web has at least one axially aligned first pin, the pin is axially aligned with a central axis of the planet carrier, and the first pin sits in an axially aligned first hole recessed on a radially outer edge of the first cheek. The connecting web is connected to the first cheek via the first pin seated in the first hole, and the first hole is opened towards the edge in such a way that a section of the first pin seated in the hole is exposed on the respective edge in the radial direction.

The publication DE 10 2016 219 949 A1 discloses a planet carrier of a planetary gear, including two axially spaced carrier cheeks made of sheet metal, which are connected via a connecting web which engages and is positively locked at least in aligned openings of the carrier cheeks. At the distal ends of the connecting web, a folded section is present in each case and rests obliquely to the longitudinal axis through the connecting web on the respective carrier cheek. The carrier web is formed from two individual sheets and is aligned in the radial direction to an axis of rotation of the planet carrier.

The publication DE 10 2017 114 452 A1 discloses a planet carrier for a motor vehicle transmission for the rotatable mounting of several planetary wheels which are intended to mesh with a sun gear, with a first partial planet carrier and a second partial planet carrier for housing the planetary wheels being firmly connected to one another. The first partial planet carrier has a tab which protrudes as an anti-rotation device through a window of the second partial planet carrier, the tab being aligned parallel to the material of the second partial planet carrier surrounding the window and resting against this material. In addition, the partial planet carriers are connected to each other via single rivets.

From the document DE 10 2011 006 285 A1, a planet carrier is known which has two half-shells, the half-shells showing recesses and the two half-shells in the area of the recesses each being directly connected to one another via two separate connecting rivets. The planet carrier formed from this has the advantage that it has a high structural rigidity.

SUMMARY

The present disclosure provides a planet carrier which is designed to be suitable for production even in a large number of variants.

The present disclosure relates to a planet carrier which is in particular suitable and/or formed for a vehicle. The planet carrier may form a torque-transmitting component in a drive train of the vehicle. The vehicle and/or the drive train can be based on an internal combustion engine and/or based on an electric motor and thus be designed as an electric vehicle, a hybrid vehicle or as an internal combustion engine vehicle. The planet carrier defines a central axis, e.g., the planet carrier rotates around the central axis during operation.

The planet carrier has two carrier shells, the carrier shells being arranged axially offset in relation to the central axis and parallel to one another. The carrier shells each have planetary wheel sections and connecting sections. In an example embodiment, the planetary wheel sections and the connecting sections alternate in the circumferential direction around the central axis on the respective carrier shell.

The planet carrier has a plurality of planetary wheels, the planetary wheels being arranged in the planetary wheel sections. Exactly one planetary wheel can be arranged in a planetary wheel section: alternatively, two planetary wheels are arranged in the planetary wheel section, which, for example, mesh with one another. The planetary wheels may be mounted via bolts, the bolts being fixed in the carrier shells in the respective planetary wheel section. In an example embodiment, the carrier shells are connected via the bolts. Alternatively, bearing devices can also be arranged in the carrier shells, with the planetary wheels having axes which are mounted in the bearing devices. In an example embodiment, the planetary wheels are regularly distributed over a pitch circle diameter around the central axis of the planet carrier.

The planet carrier has a plurality of riveting devices, the riveting devices connecting the carrier shells in the connecting sections.

It is envisaged that the connecting sections of at least one of the carrier shells are designed as forming sections. The forming sections are recessed opposite the planetary gear sections. In an example embodiment, the forming sections are recessed in the direction of the other carrier shell relative to the planetary gear sections. The carrier shell with the formed sections thus has a warmer design, for example. In an example embodiment, the inner sides of the forming sections facing in the direction of the respective other carrier shell form a maximum extension of the carrier shell in this direction.

The carrier shell with the forming section may be designed as a forming part, e.g., as a cold forming part. A metal sheet may be used as the semi-finished product for the carrier shell, and the sheet may have a material thickness greater than 2 mm, e.g., greater than 4 mm. On the other hand, the material thickness may be less than 10 mm, e.g., less than 8 mm.

Within the scope of the disclosure it is proposed that the riveting devices each have a rivet section for each carrier shell. A first of the carrier shells is thus connected to a first rivet section and a second of the carrier shells is connected to a second rivet section. Furthermore, the riveting devices each have a web section, the web section being arranged between the first and the second rivet section. The web section is designed as a spacer between the carrier shells. Thus, the carrier shells in the connecting sections do not come into direct contact, as is known from the prior art, but are spaced apart from one another in the axial direction by the spacer.

Each of the rivet sections has two single rivets, which are spaced apart from one another, e.g., in the circumferential direction. The single rivets extend a central axis and/or in a longitudinal direction in the same direction as the central axis, for example. The single rivets may pass through the carrier shells so that each carrier shell is penetrated by two single rivets per riveting device. Rivet openings for receiving the rivet section and/or the single rivets are made in the carrier shells, the rivet openings being closed all around.

The riveting device has an H-shape, e.g., in a radial plan view, with the standing legs of the H being represented by the two single rivets in each rivet section and the connecting leg of the H being formed by the web section. The axial length of the web section defines the axial distance between the two carrier shells. The single rivets of one rivet section may be arranged opposite and/or symmetrically to the single rivets of the other rivet section.

The riveting devices are made of one material and/or in one piece. Because the riveting devices consist of a common, coherent and/or unseparated material section, they do not have any further parting planes, so that the resulting planet carrier is particularly stable.

The single rivets are formed into rivet heads so that the rivet heads form end sections of the single rivets. In an embodiment, the forming is carried out by an axially acting forming force. In an embodiment, it is provided that the rivet heads are round, e.g., oval or circular, in an axial plan view: In an embodiment, the single rivets are formed, e.g., riveted, by material flow during forming, e.g., riveting, from a contour which is rectangular or square in an axial plan view into a round, e.g., oval or circular contour. In an embodiment, the material flow during forming takes place in all directions perpendicular to the central axis.

The rivet heads rest on the carrier shells in order to positively lock them to the web section. In an embodiment, the rivet heads rest on both sides in the circumferential direction and at least on one side in the circumferential direction, or alternatively also on both sides. In an embodiment, the rivet heads lie all around on the carrier shells, except for the areas that may be interrupted by rivet openings. By designing them as rivet heads, contact surfaces can be created on the carrier shells, which form a stable connection between the riveting devices and the carrier shells.

The riveting device is oriented in the same direction as a circumferential direction around the central axis. In an embodiment, the single rivets lie next to each other in relation to the circumferential direction around the central axis. The riveting device and/or the web section may have side surfaces and edge surfaces, the side surfaces being directed radially inwards and radially outwards and/or the edge surfaces being oriented in the circumferential direction, the side surfaces having a larger surface area than the edge surfaces.

In different applications, for example due to different requirements with regard to the load capacity of the planet carriers, planetary wheels with different axial widths may be required. With these requirements, in each case, the same carrier shells can be used and only different riveting devices can be used, with the riveting devices having correspondingly long web sections in order to fix the carrier shells at the desired axial distance in order to be able to install the application-specific planetary wheels. This makes it possible to produce different variants of planet carriers cost-effectively using the same carrier shells. Depending on your choice (e.g., depending on the width of the gears/planetary wheels), web lengths from slightly greater than zero to "infinity" can be set, assuming a uniform rivet hole pattern, and the same carrier shells can be used. For example, the axial distance of the carrier shells on the web sections can be set to be greater than 10 mm, e.g., greater than 20 mm and, for example, greater than 30 mm. On the other hand, the axial distance on the web sections may be smaller than 100 mm, e.g., smaller than 90 mm and, for example, smaller than 80 mm. By using the same carrier shells, larger production batches of the carrier shells can be achieved, which leads to cost-effective production, storage, etc.

Furthermore, the structural design proposes a stable and easy-to-implement construction, which has advantages over the prior art: Bending is not used as a connection technology and riveting is used as a connection technology instead, which leads to a reduction in the number of parts and an increase in stability. By using forming sections as connecting sections, on the one hand, the mechanical rigidity of the carrier shells is improved and at the same time the distance between the carrier shells is already reduced, so that the web sections only have to bridge the remaining distance between the forming sections in their axial length. In comparison to separate single rivets, the proposed solution with a riveting device with integrated and/or molded-on and/or single-material and/or one-piece single rivets is easier to assemble and is more stable in cooperation with the web section. The production of the riveting device, on the other hand, is simple since it can be designed, for example, as a stamped part. The fact that the riveting device has two single rivets and is oriented in the circumferential direction creates a compromise between the connection rigidity of the planet carrier and the space requirement on top of or on the planet carrier.

The riveting device may be made from a flat plate component. e.g., from a stamped part with an H-shape by forming, e.g., riveting, the single rivets into the rivet heads. In an embodiment, the riveting device is designed as a flat component with the side surfaces and the edge surfaces. In an embodiment, the edge surfaces are designed as cutting or separating surfaces. This means that the riveting device can be produced in a simple manner from a sheet metal by punching or separating in another way, with the web section and the rivet sections being punched out or separated as a common component by punching or separating. After installation in the carrier shells, e.g., in the rivet openings, the end regions of the rivet sections are formed into the rivet heads. On the one hand, this configuration has the advantage that the riveting devices can be manufactured cost-effectively, can be easily installed and are stable due to their design as a common component. The opposite rivet sections may be constructed identically so that the rivet device can be installed in any orientation. In this way, assembly errors are also avoided.

In an example embodiment, the two single rivets of the rivet section lie centrally and/or symmetrically on a chord of a circle around the central axis in an axial plan view. This means that they are oriented in the circumferential direction, but, for example, due to the design of the riveting device as a plate component and/or stamped part, they are arranged along the chord of a circle around the central axis. In an embodiment, a connecting line between the single rivets forms the chord of the circle. The web section is aligned along the same chord of the circle in an axial plan view. Alternatively or additionally, the two single rivets of the rivet section may be arranged in an axial plan view along a tangent of a circle around the central axis. In an embodiment, a connecting line between the single rivets forms the tangent. In an embodiment, the web section runs along the same tangent.

In an example embodiment, the forming sections are designed as beads and/or connecting flange sections. The forming sections increase the structural rigidity of the carrier shells of the at least one carrier shell. The beads can be designed, for example, as edge beads, e.g., arcuate edge beads when viewed from above. In an embodiment, the radial extent and/or extent in the circumferential direction of the forming areas is limited to the space required by the riveting device.

For example, the forming section has a contact area for the web section and the planetary wheel section has a boundary area for the planetary wheel in the planetary wheel section. It is envisaged that the contact areas are arranged offset from the boundary areas in the axial direction to the central axis of the planet carrier. The offset can be smaller than 20 mm, e.g., smaller than 10 mm and/or larger than 5 mm. The use of the web sections as spacers makes it possible to choose the size of the axial offset between the contact area and the boundary area such that the high structural rigidity is ensured, but no problems arise with forming limits in the areas of the forming sections. The tension field between the degree of deformation and the axial width of the planetary wheels is therefore equalized. The contact areas of the opposing carrier shells may form the smallest axial distance between the carrier shells, which is bridged by the web sections.

The carrier shell may have a common rivet opening for one of the rivet sections of the rivet devices. The position in the circumferential direction is defined by the single rivet and/or the rivet section. Forming the single rivets ensures that the carrier shells are clamped firmly and/or without tolerances in the circumferential direction. The common rivet opening may be designed as an elongated hole, with the common rivet opening and/or the elongated hole being oriented with the longitudinal extension in the circumferential direction. In an embodiment, the common rivet opening and/or the elongated hole runs along the chord or tangent of the associated riveting device, e.g., the single rivet and/or the web section of the riveting device. Opposite, common rivet openings may be designed to be congruent. The single rivets may be arranged in the end regions of the common rivet opening, e.g., of the elongated hole. In an embodiment, the rivet heads cover the end areas mentioned.

In an example embodiment, corresponding planetary wheel sections and connecting sections, designed as forming sections, are provided on both carrier shells. In principle, it is possible for one of the carrier shells to be designed as a flat plate and the other carrier shell to be designed with the planetary wheel sections and the forming sections. However, in order to make the planet carrier uniformly stable in both axial directions, each carrier shell may have corresponding planetary wheel sections and forming sections.

In principle, it is possible for the carrier shells to be designed differently.

In an example embodiment, however, the carrier shells are constructed identically and/or symmetrically to one another. Particularly in the design of identical carrier shells, the different components required for the planet carrier can be further reduced. At the least, in order to create a symmetrical design, it is favorable that the planet carrier can then be loaded symmetrically.

In an example embodiment, the planet carrier or the carrier shells each have four planet sections and four connecting sections.

The disclosure also relates to a planetary drive for a vehicle, the planetary drive having the planet carrier as described above.

The disclosure also comprises a set consisting of a plurality of planet carriers as described above. The planet carriers each have the same carrier shells. The carrier shells for the planet carriers can thus be kept as uniform components, possibly even as a uniform individual component. The riveting devices, on the other hand, have different axial lengths with regard to the web sections. By installing riveting devices with web sections of different lengths, the carrier shells of the planet carriers can have different axial distances and/or accommodate planet carriers of different widths. This makes it possible to represent the entire set with different axial widths based on just one carrier shell (with identical carrier shells) or just two carrier shells.

BRIEF DESCRIPTION OF THE DRAWINGS

Further features, advantages and effects of the disclosure result from the following description of exemplary embodiments and the attached figures. In the figures.

DETAILED DESCRIPTION

Figure 1:
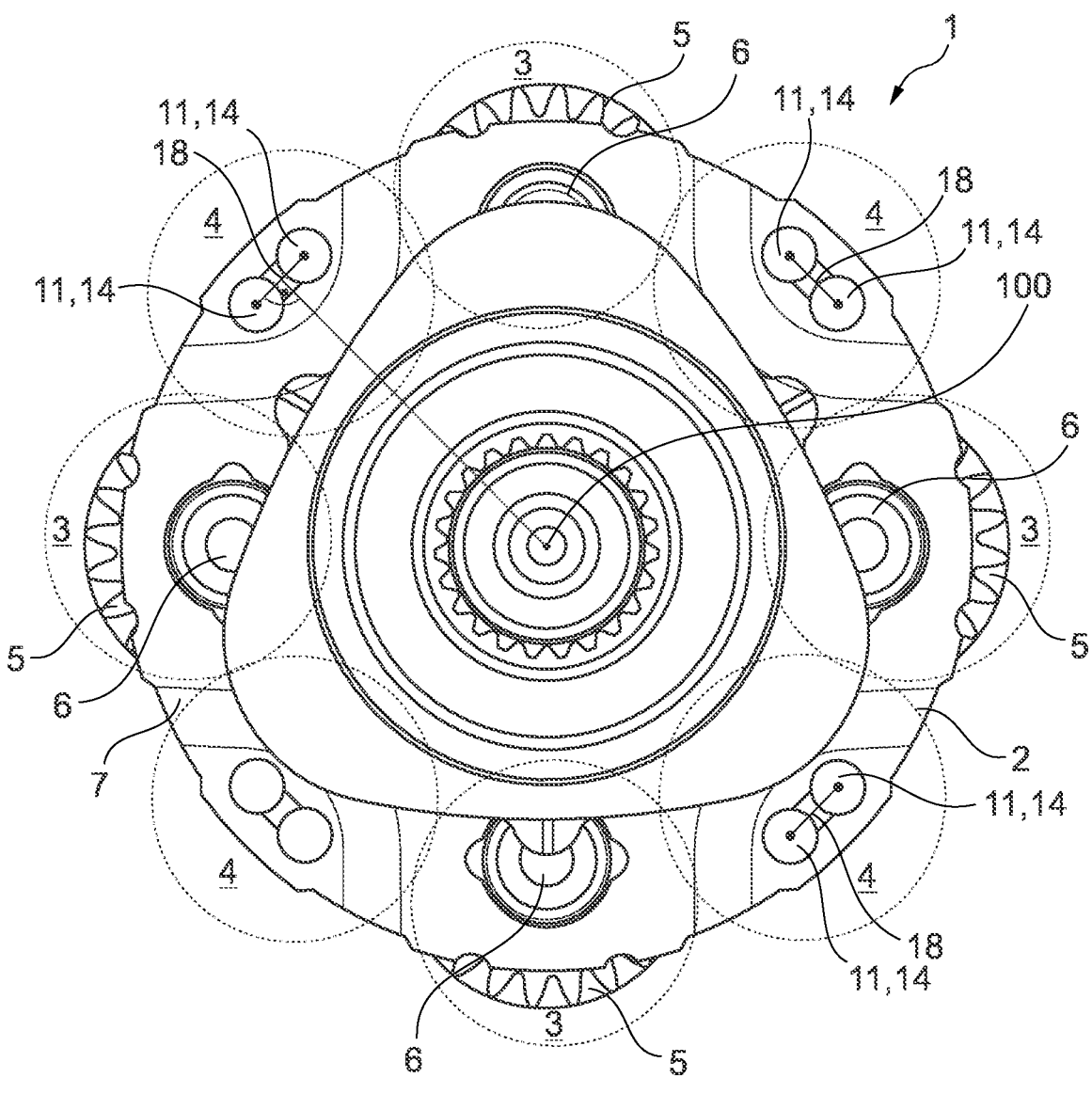
FIG. 1 shows an axial top view onto a planet carrier as an exemplary embodiment.

FIG. 1 shows a planet carrier 1 for a vehicle in a schematic top view as an exemplary embodiment. The planet carrier 1 has two carrier shells 2, the carrier shells 2 each having planetary wheel sections 3 and connecting sections 4 in the circumferential direction around a central axis 100 as the axis of rotation of the planet carrier 1. The carrier shells 2 are made as formed parts from a sheet metal material.

The planet carrier 1 has a plurality of planetary wheels 5, in this exemplary embodiment four planetary wheels 5, the planetary wheels 5 being arranged in a regularly distributed manner on a common pitch circle diameter around the central axis 100 of the planet carrier 1. In the integrated state of the planet carrier 1, the planetary wheels 5 mesh radially on the outside, for example with a hollow wheel (not shown) and/or radially on the inside with a sun wheel (not shown). The respective planetary wheels 5 are rotatably arranged on bolts 6. The bolts 6 are arranged in the planetary wheel sections 3 of the carrier shells 2 and are connected to the carrier shells 2 in a materially and/or positively locking manner. For example, the bolts 6 can be caulked. The bolts 6 extend parallel to the central axis 100 of the planet carrier 1.

The connecting sections 4 are designed as forming sections and are arranged recessed in the axial direction relative to the planetary wheel sections 3. The forming sections are realized, for example, as beads, in particular edge beads. The forming sections form connecting flange sections, with the two carrier shells 2 being connected via the connecting flange sections. The carrier shells 2 are designed as sheet metal parts, with the planetary wheel sections 3 lying in a common plane. The planetary wheel sections 3 are undeformed in the axial direction and/or correspond to the material area of a semi-finished product or intermediate product, e.g., a blank, with the connecting sections 4 being formed from the common plane in the axial direction in a forming direction.

Figure 2:
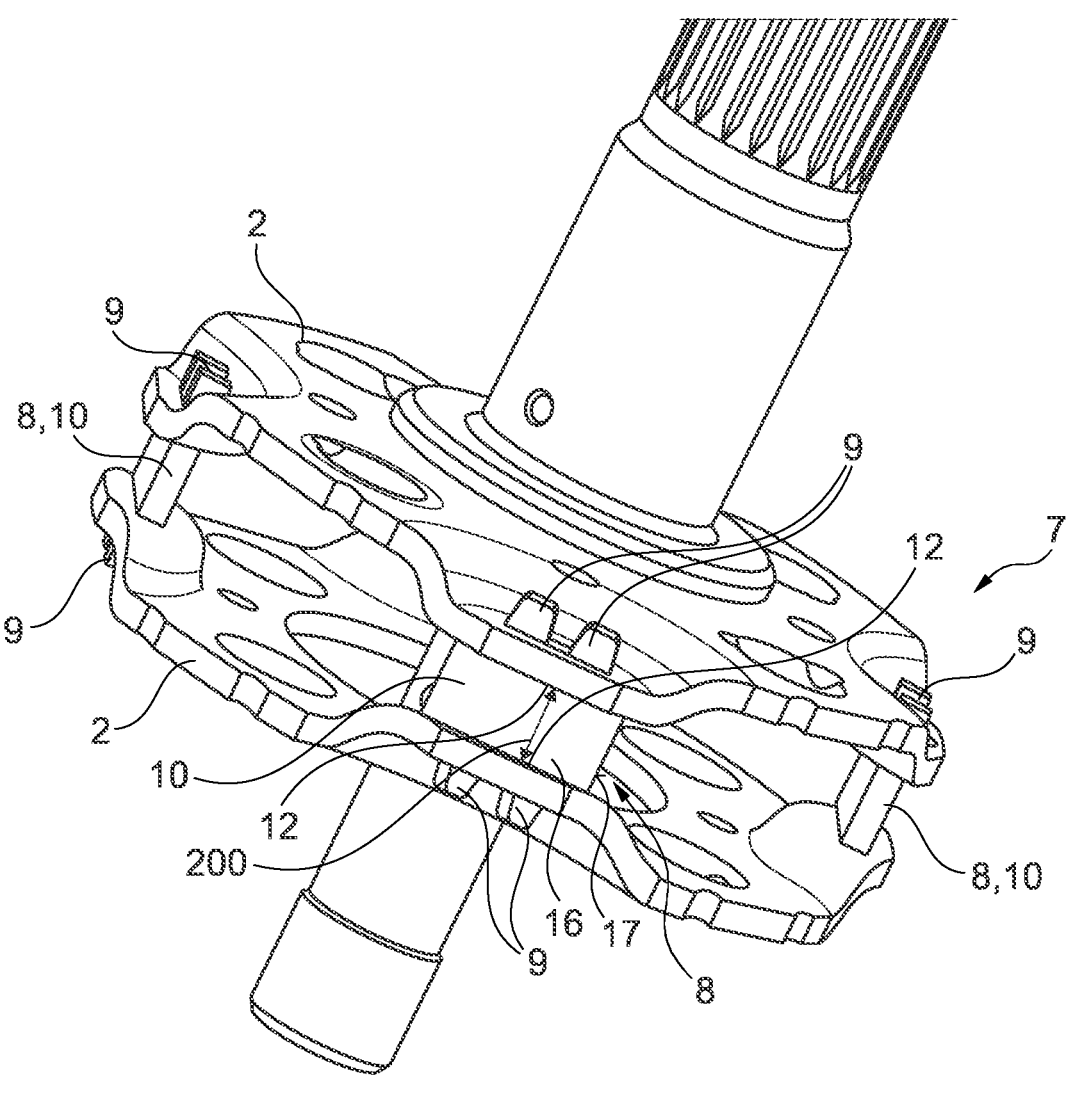
FIG. 2 is a three-dimensional view onto the housing of the planet carrier from FIG. 1.

FIG. 2 shows a schematic, three-dimensional representation of a housing 7 of the planet carrier 1, the housing 7 being shown without the planetary wheels 5 and the bolts 6. In this illustration, the two carrier shells 2 can again be seen, which are arranged axially offset from one another. From the illustration it follows that the carrier shells 2 are designed symmetrically with respect to a plane of symmetry as a radial plane to the central axis 100. The two carrier shells 2 are designed to be identical in construction.

The two carrier shells 2 are connected to one another via riveting devices 8, the riveting devices 8 each being arranged in the connecting sections 4 and/or being connected to them. The riveting devices 8 have a rivet section 9 for each carrier shell 2, the two rivet sections 9 being connected to one another via a web section 10. The riveting device 8 comprising the rivet sections 9 and the web section 10 is made of one material and/or in one piece. When manufacturing the planet carrier 1, the riveting device 8 is used as an individual component. The individual component is designed, for example, as a stamped component. The web section 10 has side surfaces 16 and edge surfaces 17. In the event that the riveting device 8 is designed as a punched component, the edge surfaces 17 form punched surfaces. The side surfaces 16 are aligned outwards or inwards in the radial direction. The edge surfaces 17, on the other hand, are oriented in the circumferential direction around the central axis 100. The riveting device 8 is designed as a surface component, with the side surfaces 16 forming the main surfaces.

The rivet section 9 each has two single rivets 11, the single rivets 11 extending in the axial direction parallel to the central axis 100. In this embodiment, the riveting devices 8 are each designed in an H shape in a radial plan view of the riveting devices 8, with the single rivet 11 forming the standing legs and the web section 10 forming the lying leg. The single rivets 11 are arranged at a distance from one another. In the illustration in FIG. 2, the single rivets 11 are shown before forming. In an axial plan view; the single rivets 11 are rectangular, with a gap being provided between the single rivets 11.

The web section 10 rests on the inside of a contact area 12 on the carrier shells 2 and forms a spacer between the carrier shells 2. The web section 10 can, for example, have a rectangular shape in a radial plan view. For example, the web section 10 forms a counter-contact area in the axial direction, from which the single rivets 11 protrude and/or stand out and against which the abutment area 12 rests. The carrier shells 2 therefore have an axial distance 200, the axial distance 200 corresponding to the axial length of the web section 10. The carrier shells 2 rest in a positively locking manner on the web section 10 in the contact areas 12. The axial distance 200 is greater than 0, for example greater than 10 mm.

As can be seen in particular from FIG. 1, the rivet heads 14 and/or the single rivets 11 are each arranged offset from one of the rivet areas 9 in the circumferential direction around the central axis 100. Looking more closely, the rivet heads 14 and/or the single rivets 11 each define a connecting line 18 from one of the rivet areas 9 with the respective central axes. The connecting lines 18 lie in a radial plane to the central axis 100. The connecting line 18 lies on a tangent of a circle around the central axis 100. Considered alternatively or in addition, the connecting line 18 lies centrally and/or symmetrically on a chord of a circle around the central axis 100. Alternatively or additionally, the connecting line 18 is aligned perpendicular to a radial vector or to a radius to the central axis 100. In an axial plan view, the web section 10 is congruent with the connecting line 18 and/or extends along the connecting line 18. The rivet opening 13, designed as an elongated hole, extends along the connecting line 18.

Figure 3A:
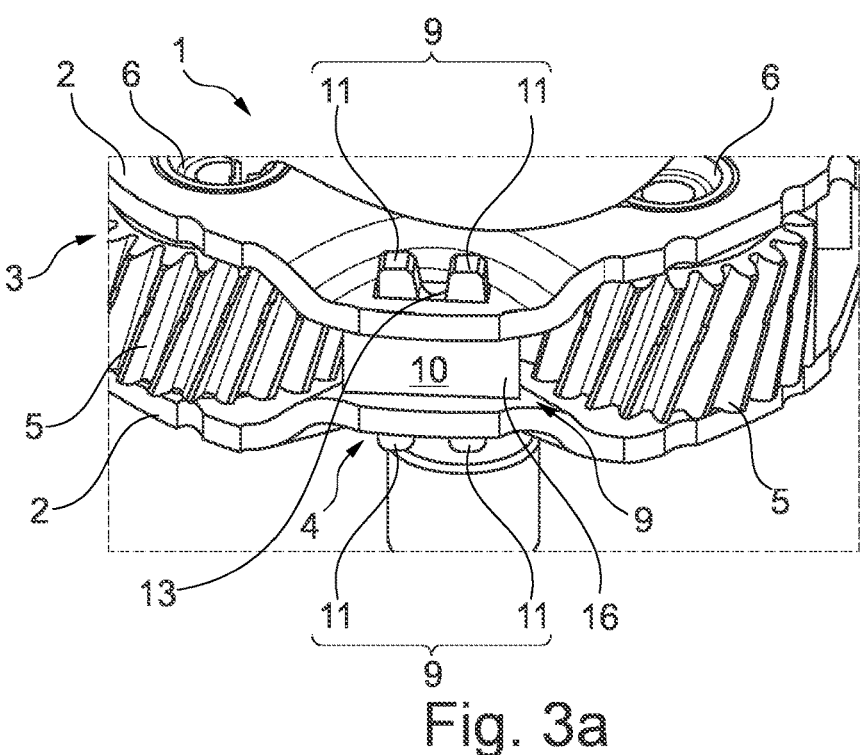
FIGS. 3 *a*, *b* each show a detailed view in the area of the connecting sections of the planet carrier with partially formed riveting devices.
Figure 3B:
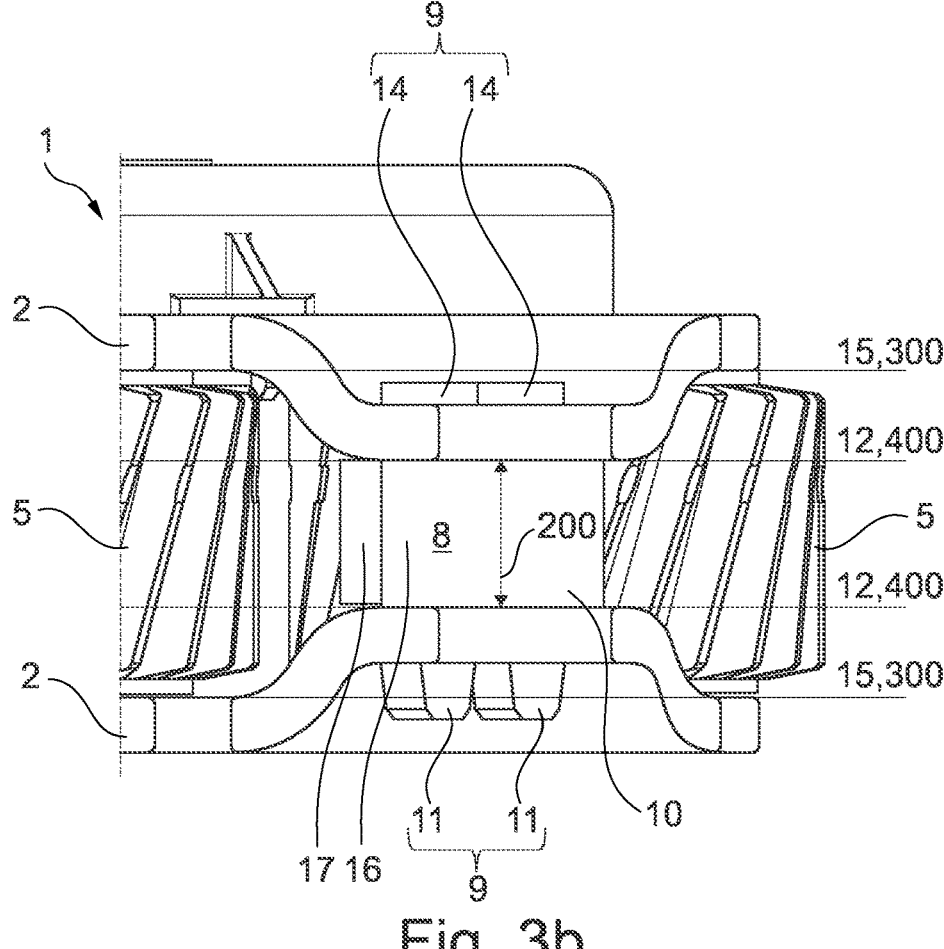

In FIGS. 3 *a* and 3 *b*, the riveting device 8 with the rivet sections 9 comprising the two single rivets 11 is shown again in the undeformed state and in FIG. 3 *b* the upper carrier shell 2 is shown in the deformed state and the lower carrier shell 2 in the undeformed state.

From the illustrations it can be seen that the carrier shells 2 each have a rivet opening 13, the complete rivet section 9, e.g., the two single rivets 11, being arranged and/or accommodated in the rivet opening 13. By shaping the single rivets 11, rivet heads 14 are formed, which rest on the carrier shells 2 and fix them in a positively locking manner on the web section 10 in the axial direction. This creates a positive connection between the carrier shells 2 and the riveting devices 8 and thus indirectly between the two carrier shells 2.

Furthermore, the forming of the single rivets 11 ensures that their material flows in the circumferential direction, so that the carrier shells 2 are each connected to the riveting devices 8 in the circumferential direction without tolerances. The single rivets 11 are deformed by a forming force acting in the axial direction, so that a material flow occurs in the circumferential direction and also in the radial direction in relation to a respective central axis of the single rivets 11. In an axial plan view, the single rivets 11 each have the rivet head 14, which is designed to be round, e.g., circular, oval or as a rectangle with rounded, for example, outwardly rounded side edges and/or corner regions with respect to the respective central axis.

The riveting device 8 has the H-shape in a radial plan view before the forming and/or after the forming, e.g., the riveting. Before forming, the standing legs of the H-shape are formed by the single rivets 11 and the lying leg of the H-shape is formed by the web section 10. After forming, the standing legs of the H-shape are formed by the single rivets 11 and, as the end section of the single rivets 11, the rivet heads 14 and the horizontal leg of the H-shape are formed by the web section 10. The standing legs of the H-shape are oriented in the same direction as the central axis 100.

The rivet heads 14 can be arranged at a distance from one another, for example, in such a way that they do not influence each other with regard to the material flow during forming.

FIG. 3 *b* in particular shows that a boundary plane 300 is defined by the carrier shells 2 in the planetary wheel sections 3 through boundary areas 15 for the planetary wheels 5 and a connection plane 400 is defined by the contact areas 12 of the carrier shells 2 in the connecting sections 4, whereby the connection plane 400 is arranged axially offset from the boundary plane 300.

The production-friendly design of the planet carrier 2 has, on the one hand, symmetrical components, e.g., identical components, that can be used for the two carrier shells 2. Furthermore, the axial distance 200 between the two carrier shells 2 depends exclusively on the axial length of the web section 10 of the riveting devices 8, so that different axial distances 200 between the carrier shells 2 can be set by different riveting devices 8. This makes it possible to represent planet carriers 1 with different axial installation spaces for the planetary wheels 5 with the same pair of carrier shells 2 or even with the same carrier shell 2.

As a result, the structural design makes it possible to produce a set of planet carriers 1, whereby the carrier shells 2 in the set are each designed the same, but the axial distances 200 between the carrier shells 2 can be designed differently and, for example, planetary wheels 5 with different axial widths can be installed.

REFERENCE NUMERALS

1 Planet carrier
2 Carrier shell
3 Planetary wheel section
4 Connecting section
5 Planetary wheel
6 Bolt
7 Housing
8 Riveting device
9 Rivet section
10 Web section
11 Single rivet
12 Contact region
13 Rivet opening
14 Rivet heads
15 Boundary areas
16 Side surfaces
17 Edge surfaces
18 Connecting line
100 Central axis
200 Axial distance
300 Boundary plane
400 Connection plane

The invention claimed is:

1. A planet carrier, the planet carrier defining a central axis, the planet carrier comprising:
  two carrier shells, the carrier shells each having planetary wheel sections and connecting sections,
  planetary wheels, the planetary wheels being arranged in the planetary wheel sections, and
  several riveting devices, the riveting devices connecting the carrier shells in the connecting sections,
  wherein the connecting sections of at least one of the carrier shells are designed as forming sections which are recessed relative to the planetary wheel sections, and
  the riveting devices each have a rivet section for each carrier shell and a web section, the web section being designed as a spacer between the carrier shells, each of the rivet sections has two single rivets, so that the riveting device has an H-shape, the riveting devices each being made of one material or in one piece, the single rivets having rivet heads which are located on the carrier shells, rest on them, and fix them in a positively locking manner in an axial direction on the web section, the riveting devices each being oriented in the same direction in a circumferential direction around the central axis, wherein:
    the two single rivets of the rivet section lie centrally or symmetrically on a chord of a circle around the central axis and the web section is aligned along the chord; or the two single rivets of the rivet section lie on a tangent to a circle around the central axis and the web section is aligned along the tangent.
2. The planet carrier according to claim 1, wherein each riveting device is made from a flat plate component or a stamped part with an H-shape by forming the single rivets into the rivet heads.
3. The planet carrier according to claim 1, wherein each carrier shell has a common rivet opening for a rivet section or for the two single rivets.
4. The planet carrier according to claim 1, wherein both carrier shells have corresponding planetary wheel sections and forming sections.
5. The planet carrier according to claim 4, wherein the carrier shells are constructed identically or symmetrically to one another.
6. The planet carrier according to claim 1, wherein the planet carrier has four planetary wheel sections and four connecting sections.
7. A planetary drive for a vehicle, comprising the planet carrier according to claim 1.
8. A set of a plurality of planet carriers according to claim 1, wherein the planet carriers each have the same carrier shells, the riveting devices having different axial lengths of the web section, so that:
  the carrier shells of the planet carriers have different axial distances; or
  the planet carriers have planetary wheels of different widths.
9. A planet carrier comprising:
  a central axis;
  a pair of carrier shells, each carrier shell comprising planetary wheel sections and connecting sections, the connecting sections arranged as forming sections recessed relative to the planetary wheel sections;
  a plurality of planetary wheels, each disposed in a planetary wheel section; and
  a plurality of riveting devices connecting the carrier shells at the connecting sections, each riveting device:
    oriented in a circumferential direction around the central axis;
    formed in one piece from one material; and
    comprising an H-shape formed from:
      a web section arranged as a spacer between the carrier shells; and
      a rivet section comprising a pair of single rivets, each single rivet comprising a rivet head disposed on one of the carrier shells to fix the one of the carrier shells on the web section, wherein each pair of single rivets lies centrally or symmetrically on a chord of a circle extending around the central axis and each web section is aligned along the chord.
10. The planet carrier of claim 9 wherein each riveting device is a flat plate component or a stamped part with formed rivet heads.
11. The planet carrier of claim 9 wherein each carrier shell comprises a common rivet opening for each rivet section or each pair of single rivets.
12. The planet carrier of claim 9 wherein the planetary wheel sections and the connecting sections of each one of the pair of carrier shells corresponds to the planetary wheel sections and the connecting sections of the other one of the pair of carrier shells.
13. The planet carrier of claim 12 wherein the pair of carrier shells are constructed identically or symmetrically to one another.

14. The planet carrier of claim 9 wherein each of the pair of carrier shells comprises exactly four planetary wheel sections and exactly four connecting sections.

15. A planet carrier comprising:

a central axis;

a pair of carrier shells, each carrier shell comprising planetary wheel sections and connecting sections, the connecting sections arranged as forming sections recessed relative to the planetary wheel sections;

a plurality of planetary wheels, each disposed in a planetary wheel section; and a plurality of riveting devices connecting the carrier shells at the connecting sections, each riveting device:

oriented in a circumferential direction around the central axis;

formed in one piece from one material; and comprising an H-shape formed from:

a web section arranged as a spacer between the carrier shells; and a rivet section comprising a pair of single rivets, each single rivet comprising a rivet head disposed on one of the carrier shells to fix the one of the carrier shells on the web section, wherein each carrier shell comprises a common rivet opening for each rivet section or each pair of single rivets.

16. The planet carrier of claim 15 wherein each riveting device is a flat plate component or a stamped part with formed rivet heads.

17. The planet carrier of claim 15 wherein the planetary wheel sections and the connecting sections of each one of the pair of carrier shells corresponds to the planetary wheel sections and the connecting sections of the other one of the pair of carrier shells.

*    *    *    *    *